April 6, 1954  C. LEEDAM  2,674,669
PEDAL OPERATED BRAKING SYSTEM OF ROAD VEHICLES
Filed Dec. 13, 1952
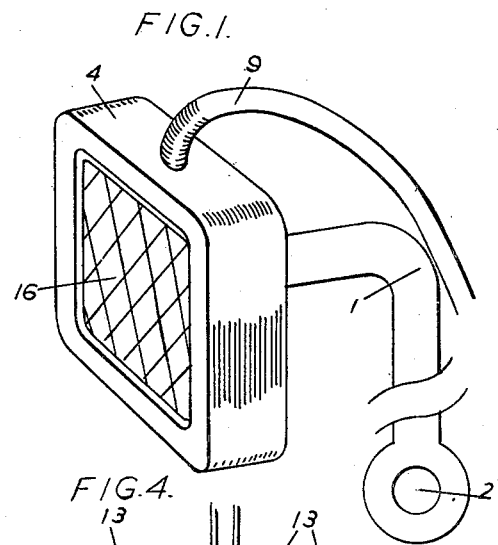
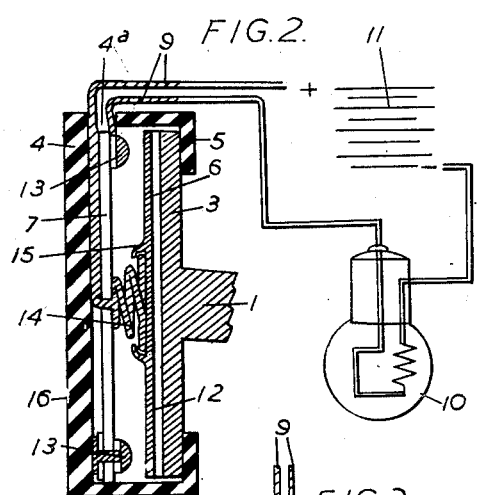
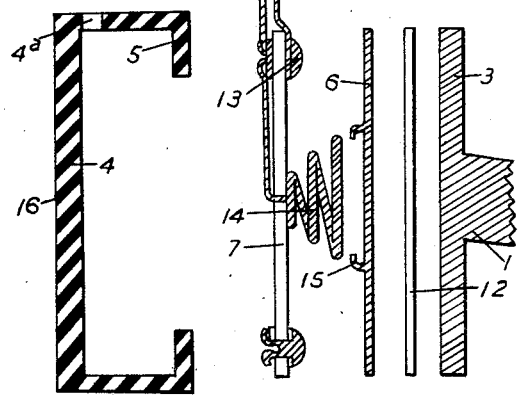
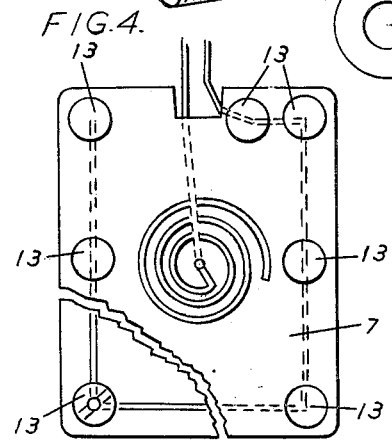
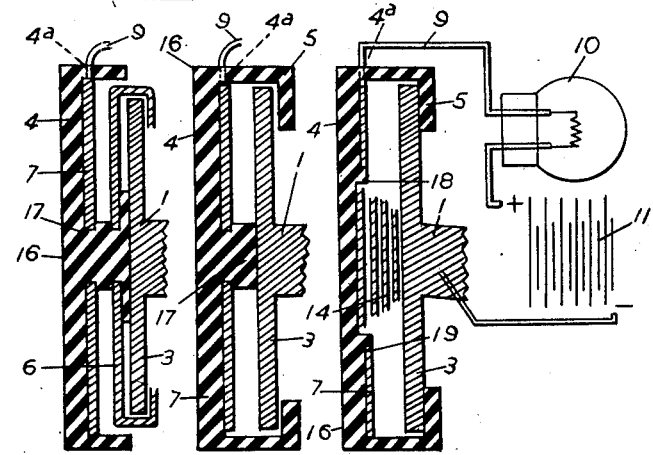
Inventor
Clive Leedam
By Malcolm V. Rich
Attorney Patented Apr. 6, 1954

2,674,669

UNITED STATES PATENT OFFICE 2,674,669

PEDAL OPERATED BRAKING SYSTEM
OF ROAD VEHICLES

Clive Leedam, Cradley Heath, England

Application December 13, 1952, Serial No. 325,843

3 Claims. (Cl. 200—86.5)

This invention relates to a pedal operated braking system of a road vehicle.

It is orthodox practice to incorporate with such a system an electric switch in the lighting circuit so that when the pedal is operated into a braking position the switch will illuminate a warning lamp or so called "stop light" at the rear of the vehicle.

This "stop light" does not become effective until the pedal has been depressed or when the brake has been operated so that a time lag occurs between intended braking and the pedal operation. This time lag, although it may be of very short duration, has the disadvantage that until braking is imminent or effective the "stop light" is ineffective and a rear driver may be unable to apply his brakes quick enough to avoid accident.

The object of the present invention is to provide simple and inexpensive equipment for avoiding this objection.

According to the present invention there is provided for use on a road vehicle having a pedal operated braking system in which the pedal has a pedal plate, a rubber pedal cap adapted to fit over said pedal plate said cap including an inwardly turned boundary flange spaced at a greater distance from the tread face of said cap than the thickness of said pedal plate, said flange being capable of engaging the back of said pedal plate whereby said cap is retained to said plate yet is permitted to move relatively thereto, a pair of spaced electrical contact plates housed in said cap, resilient means interposed between said contact plates and operating to urge said plates apart and simultaneously to press said boundary flange into engagement with said back of said pedal plate, and electric wiring connected to said plates and passing through an opening in said cap to the exterior thereof for wiring in to an electric lamp circuit.

According to one embodiment of the invention, a rubber pedal cap provided with an inturned flange houses a pair of relatively movable contact plates which are normally spaced a short distance apart by resilient means.

These contact plates fit snugly within the cap leaving sufficient space for the cap to be sprung over the tread plate of a brake pedal in the normal way so that a fixed contact plate will abut against the surface of the tread plate and form one of the contacts, the other movable contact plate being arranged to be wired up in a warning lamp circuit.

The position of the contact plates is so arranged that the slightest pressure on the head of the cap will connect them electrically thus to provide a very sensitive response to pressure.

As an alternative construction, a sensitive switch is in the head of the pedal cap so as to be operable under light foot pressure when the cap is in position on the tread plate.

It is contemplated to market a cap and switch combination and a warning lamp for wiring into an electrical circuit of an automobile, so that in order to install the device it would merely be required that a suitable cap be engaged with a suitable pedal plate of the foot brake. The switch being wired into an electrical circuit of a warning lamp attached at a rear position of the vehicle.

Several experimental constructional forms of the invention are illustrated by way of example in the accompanying drawing wherein:

Fig. 1 is a perspective view showing a rectangular pedal cap in position on a standard motor car pedal.

Fig. 2 is a vertical section of Fig. 1 together with a wiring diagram.

Fig. 3 is an exploded view of the pedal cap in Fig. 2.

Fig. 4 is an elevation of a contact plate incorporated in Figs. 2 and 3.

Figs. 5, 6, 7 and 8 are vertical sections of modified forms of the invention.

Referring to Figs. 1 to 4, there is shown in Fig. 1 a conventional pedal 1 for operating the mechanical or hydraulic brake mechanism of a motor road vehicle and which is angularly movable about a fixed axis 2 as is normal, this pedal 1 normally including a pedal plate 3 fitted with a rubber or like cap 4 formed with an inturned boundary retaining flange 5 engaging the back of the plate 3. Ordinarily, this cap 4 is a tight fit on the plate 3 and forms a non-slip pad for the user. According to the invention, an electric switch comprising relatively spaced contacts 6, 7, is incorporated in the cap 4 and connected by wiring 9, passing through an opening 4a in said cap, and in the circuit of an electric lamp 10 to be placed at the rear of the vehicle and supplied by a battery 11 which is conveniently the storage battery of the vehicle. The flange 5 is spaced at a greater distance from the tread face of said cap 4 than the thickness of said plate 3, the flange 5 retaining the cap 4 on the plate 3 yet permitting the cap to move relatively to the plate. The fixed contact 6 is a light gauge sheet insulated from the plate 3 by a separator 12 and the movable contact 7 has several contact positions 13 in its circuit. The contact 7 is normally urged apart from the contact 6 by a centrally arranged coiled spring 14 retained on the plate 6 by hooks, or the like 15. The cap 4 is bodily movable to a small extent, say 1/4", relatively to the pedal plate 3. It will be understood that in practical use, light foot pressure on the face 16, preliminary to intended braking, will displace the cap 4 relatively to the pedal plate 3 when the contact 7 will make electrical connection with the contact 6 causing the warning lamp 10 to be lit. The provision of the several contact positions 13 enable electrical connection to be made even, as the case may be, if the applied pressure on the face 16 is not truly central. In a simplified construction according to Fig. 5 which incorporates the cap 4 and contacts 6, 7, the spring 14 is dispensed with and the contacts are urged apart by utilizing the inherent resiliency of a central rubber plug 17 moulded in the cap 4. The fixed contact 6 is bent over the pedal plate 3 which forms an earthing contact and said contact has a central hole, which snap engages an annular groove in said plug 17 thereby to retain the contact 6 coaxially thereto.

According to a further simplified construction shown in Fig. 6, the fixed contact 6 is dispensed with and the pedal plate 3, forming an earthing contact, is maintained spaced from the movable contact 7 by the inherent resiliency of the central plug 17 above referred to.

According to a still further construction as shown in Fig. 7 the plug 17, as incorporated in Figs. 5 and 6 is dispensed with and a spring 14 as in Figs. 1–4 is substituted. Although this construction follows generally that of Fig. 6, it will be seen that the inner face of the cap 4 has a central recess 18 to locate the spring 14 and the movable contact 7 is retained in position by its central bore engaging a rim 19 on the inner face of said cap 4.

Referring to Fig. 8, there is illustrated a very simple construction in which a very simple, sensitive switch 20 is moulded centrally in the face of the cap 4.

It will be appreciated that in all forms of the invention, an electrical switch is incorporated by various methods with a pedal plate cap, usually made of rubber or rubber composition, and which can be readily fitted to existing pedal plates and wired up to a storage battery having a warning lamp in the circuit. It will be understood that minor changes as to design or construction may be necessary in order to adapt such pedal caps to differing shapes of pedal plates.

What I claim is:

1. For use on a road vehicle provided with a pedal operated braking system in which said pedal has a pedal plate by which said pedal is adapted to be operated, a rubber pedal cap adapted to fit over said pedal plate of said pedal, said cap including an inwardly turned boundary flange spaced at a greater distance from the tread surface of said cap than the thickness of said pedal plate, said flange being capable of engaging the back of said pedal plate whereby said plate is permitted to move relatively thereto, a pair of electric contact plates in said cap, a central plug moulded in said cap and projecting from the inner face of said cap, said plug operating to urge said contacts apart, and electric wiring connected at least to one of said plates and passing through an opening in said cap to the exterior thereof.

2. Pedal cap according to claim 1, in which a relatively fixed contact plate of said contact plates has a central hole which snap engages a groove in said plug and is fastened to said pedal plate.

3. For use on a road vehicle provided with a pedal operated braking system in which said pedal has a pedal plate by which said pedal is adapted to be operated, a rubber pedal cap adapted to fit over said pedal plate said cap including an inwardly turned boundary flange spaced at a greater distance from the tread face of said cap than the thickness of said pedal plate, said flange being capable of engaging the back of said pedal plate whereby said cap is retained to said plate yet is permitted to move relatively thereto, a pair of spaced electrical contact plates housed in said cap, resilient means interposed between said contact plates and operating to urge said plates apart and simultaneously to press said boundary flange into engagment with said back of said pedal plate, and electric wiring connected to said plates and passing through an opening in said cap to the exterior thereof for wiring into an electric lamp circuit.

References Cited in the file of this patent

UNITED STATES PATENTS

| Number | Name | Date |
| --- | --- | --- |
| 1,095,902 | Marson | May 5, 1914 |
| 1,674,027 | Van Beventer | June 19, 1928 |
| 2,032,841 | Gerhart | Mar. 3, 1936 |

FOREIGN PATENTS

| Number | Country | Date |
| --- | --- | --- |
| 88,005 | Austria | Apr. 15, 1924 |
| 393,140 | Great Britain | June 1, 1933 |
| 511,785 | Germany | Nov. 1, 1930 |